United States Patent
Oetiker

[15] 3,650,037
[45] Mar. 21, 1972

[54] METHOD AND APPARATUS ASSURING THE STEADY FLOW OF TREATMENT GAS THROUGH A MIXTURE OF BULK MATERIALS

[72] Inventor: Hans Oetiker, St. Gall, Switzerland
[73] Assignee: Gebruder Buhler AG, St. Gall, Switzerland
[22] Filed: Mar. 31, 1970
[21] Appl. No.: 34,753

[30] Foreign Application Priority Data
Mar. 31, 1969 Switzerland ..........................4832/69

[52] U.S. Cl...................................34/10, 34/57 A, 263/21 A
[51] Int. Cl..........................................................F26b 3/08
[58] Field of Search................34/10, 57; 263/21 A; 110/28 J

[56] References Cited
UNITED STATES PATENTS 2,371,619  3/1945  Hartley..................................34/57 A
2,513,369  7/1950  Shaw....................................34/57 A X

*Primary Examiner*—Edward G. Favors
*Attorney*—McGlew and Toren

[57] ABSTRACT

A method for assuring a steady flow of treatment gas through a mixture of bulk materials flowing, in a dense, homogeneous fluidized bed layer of varying height, over a porous, gas-permeable material support, comprises providing a screen-like porous gas-permeable mat as part of the support and carrying the bulk materials, and providing a perforated plate in spaced relation beneath the mat and covered by the treatment gas. The treatment gas, in addition to the effect thereon exerted by the porous mat and the fluidized layer, is subjected to a velocity variation caused by the diaphragm effect of the flow-through area of the perforated plate. The velocity of the gas is controlled within a range assuring maintenance of a dense, homogeneous fluidized bed layer. The diaphragm effect is selected, within the velocity range, at a value inversely proportional to the square root value of the specific surface load of the maximum admissible bulk material layer acting on the material support.

12 Claims, 5 Drawing Figures

PATENTED MAR 21 1972  3,650,037
SHEET 1 OF 3
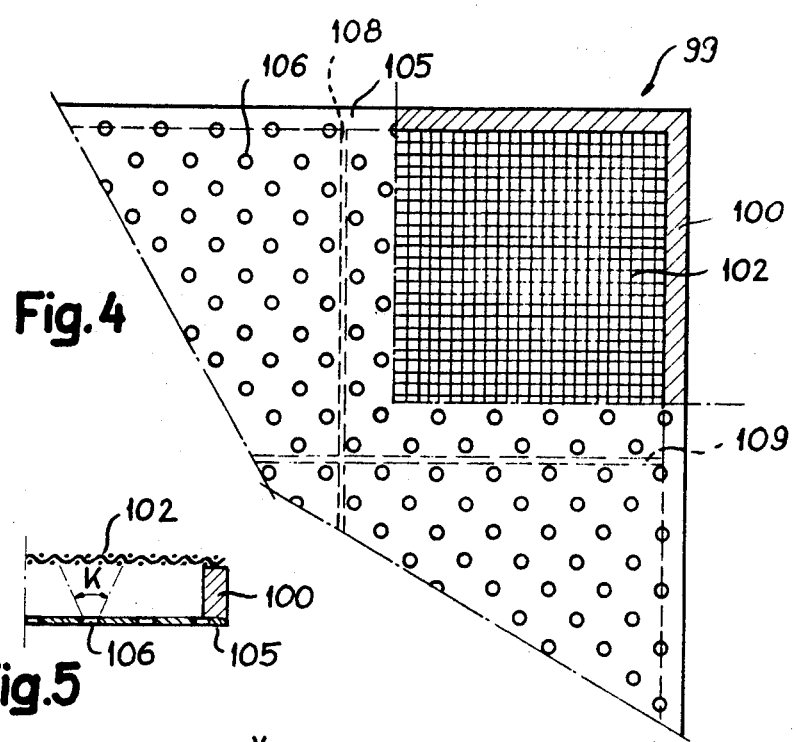
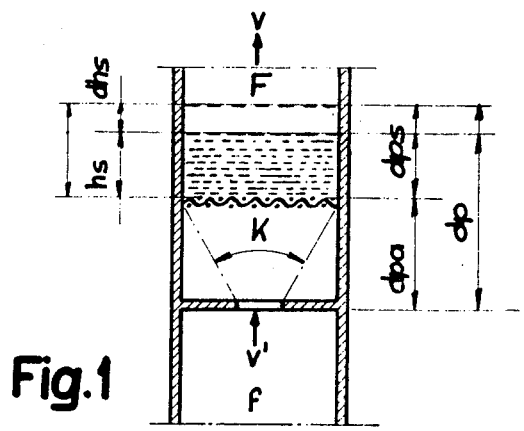
INVENTOR.
HANS OETIKER
BY
McGlew & Toren
ATTORNEYS

3,650,037

METHOD AND APPARATUS ASSURING THE STEADY FLOW OF TREATMENT GAS THROUGH A MIXTURE OF BULK MATERIALS

BACKGROUND OF THE INVENTION

A large number of publications, of all types, deal with the treatment of different bulk materials of solid and mixed solid-fluid consistency in aerated form, and which treatment is generally called fluidized bed or turbulence layer treatment. The results to be attained by such treatment vary considerably, whether the treatments are reaction treatments of the bulk material to be contacted with the activators acting thereon for the reduction of the fluidized beds or turbulence layer, or whether the treatments are sifting, separating or classifying operations on the bulk materials in the fluidized bed under the influence of the fluidizing medium, and possibly accompanied by simultaneous mechanical vibration.

A principal study, with "Contributions to the Theory of the Design of Turbulence Layers," was published by C. Vincenz in Revue Roumaine Sci. Techn., Series Metallurgy, Vol. 12 (1967) No. 2, pp. 185–206. In this publication, three forms of fluidized bed design are described in detail as follows:

a. The homogeneous-dense turbulence layer, hereinafter referred to as the dense homogeneous fluidized bed layer to facilitate an understanding of the invention.

b. The heterogeneous turbulence layers, which can also be termed, more descriptively, the unstable, pulsating pushing turbulence layers.

c. The homogeneous-loose turbulence layer where the bulk material is again stable, but where the material particles are maintained suspended in a much looser phase.

The author of this publication shows that the dense homogeneous fluidized bed layer is stable in only an extremely small range of minimum and maximum velocity of the fluidization medium without the formation of breakthrough bubbles, that the unstable, pulsating pushing turbulence layer with the bubbling, canalizing phenomena leads to intensive mixing of the layer, and that only the homogeneous-loose turbulence layer, in whose treatment the author is particularly interested, is also stable. This last mentioned turbulence layer works under the assumption of a high velocity of the treatment medium and with a relatively large pressure gradient.

It is known to treat bulk materials of different types, particularly of grain, which latter is of interest in this connection, in a fluidized bed layer, using steady or pulsating treatment media currents, particularly treatment-gas currents, flowing through the bulk material layer. The porous, gas-permeable supports for carrying the bulk material layer to be treated also may be partly steady and partly moved mechanically. The mechanical movement can have a feeding effect on the bottom material layer, while, with suitable inclination of the support, the upper material layers flow off like a fluid under the influence of the fluidization by the treatment gas. Such treatment of bulk materials, particularly grain, in a gas-solid fluidized bed have the particular purpose to separate the bulk material into two or more fractions of different specific gravities, and which are to be obtained separately with maximum purity.

Heretofore, however, great difficulties have always been encountered in adjusting the treatment method to stable conditions, and these difficulties generally are due to the fact that the operation takes place in the above indicated range of the unstable, pulsating pushing turbulence layer. In this range, the bulk material is not separated clearly, at least not for certain fractions. On the contrary, a mixing process takes place. In order to reduce these difficulties, it has been suggested to arrange a screen construction in spaced relation beneath the porous, gas-permeable mat and in such a way that oblong slots, which extend over the surface of the material support, are provided between the individual strands of the screen. As will be demonstrated hereinafter, it has not been possible, by this measure, to bring the treatment conditions into the range of the homogeneous dense fluidized bed, since the area ratio between the perforation or flow-through area of the screen and the total supporting surface of the material, thus obtained, is not sufficiently small.

SUMMARY OF THE INVENTION

This invention is directed to a method and apparatus for assuring a steady flow of treatment gas through a mixture of bulk materials which flows, in a dense homogeneous fluidized bed layer of varying height, over a porous gas-permeable material support comprising a screen-like porous gas-permeable mat, for carrying the bulk material, and a perforated plate, arranged in spaced relation beneath the mat and having the treatment gas flowing therethrough before flowing through the gas-permeable mat.

In accordance with the invention, it has been found that an optimum separation into two or more fractions is possible in the first stable range of the fluidization, the above indicated very narrow zone of the dense homogeneous fluidized bed. However, for such optimum separation, it is also necessary to determine the necessary method steps and apparatus components.

In accordance with the invention method, the treatment gas is subjected, in addition to being subjected to the influence exerted by the mat and the fluidized bed layer, to a velocity variation caused by the diaphragm effect of the perforation or flow-through area of the perforated plate. The value of the diaphragm effect is so selected, within a velocity range which is determined to assure a dense homogeneous fluidized bed layer, that it is inversely proportional to the square root value of the specific surface load of the maximum admissible bulk material layer acting on the material support.

In contrast to known methods for attaining a preselected fluidized bed behavior by using perforated plates acting in the nature of diaphragms, it has further been found, in accordance with the present invention, that the ratio of the area of the perforations to the entire plate area must not only be from one-half to one-fifth, as is already known, but the more important relation to the specific surface load, as determined by the required maximum height of the bulk material layer, must be satisfied. In order to meet this requirement, it is known that characteristic values of the treatment gas, of the acceleration due to gravity, and of the velocity variations of the treatment gas, in the admissible variation range of the height of the layer, are taken into consideration as a proportionality factor in the determined relation.

For the economical range for carrying out the invention method, additional limiting requirements are necessary, particularly with respect to the pressure range within which the treatment must take place. This limitation has a very substantial effect on the equipment cost, particularly with respect to the blower and dust separators.

The invention is further directed to a porous, gas-permeable material support for performing the method, and whose principal characteristic is that the area of the perforation of the flow-through area of the perforated plate through which the treatment gas flows is less than, or at least equal to, one-tenth of the total area of the material support. The dimensions of this essential element, namely the material support, for constructing a device whose other features are known overall, such as housing elements, supporting elements, air inlets, air outlets, air flow interruptors and oscillators, if necessary, are thus determined, and this leads to the attainment of the above mentioned objective of a sharp separation of the bulk material into at least two fractions.

Furthermore, the area of the gas-permeable porosity of the screenlike mat can be at least twice as large as that of the perforation or flow-through area. This ensures, to a great extent, a trouble-free operation of the material support, since very fine impurities do not cause clogging of the pores of the mat, which would additionally throttle or stop the flow of the treatment gas and reduce or prevent the fluidization.

An object of the invention is to provide an improved method for insuring a steady flow of treatment gas through a mixture of bulk materials which flows in a dense homogeneous fluidized bed layer of varying height over a porous gas-permeable material support.

Another object of the invention is to provide novel apparatus for performing such a method.

A further object of the invention is to provide such a method and apparatus in which the material support comprises a screenlike porous gas-permeable mat, for carrying the bulk material, and a perforated plate, arranged in spaced relation beneath the mat and having the treatment gas flowing therethrough.

Another object of the invention is to provide such a method and apparatus in which there are certain definite limiting relations between the flow areas of the mat and of the perforated plate.

For an understanding of the principles of the invention, reference is made to the following description of a typical embodiment thereof as illustrated in the accompanying drawings.

BRIEF DESCRIPTION OF THE DRAWINGS

In the drawings:

FIG. 1 is an axial sectional view through a pipe having a single diaphragm and illustrating the principal relations between the gas current the the bulk material layer;

FIG. 4 is a bottom plan view, partly in horizontal section, of a preferred embodiment of a material support in accordance with the invention; and FIG. 5 is a partial vertical sectional view through the material support.

DESCRIPTION OF THE PREFERRED EMBODIMENT

Figure 2:
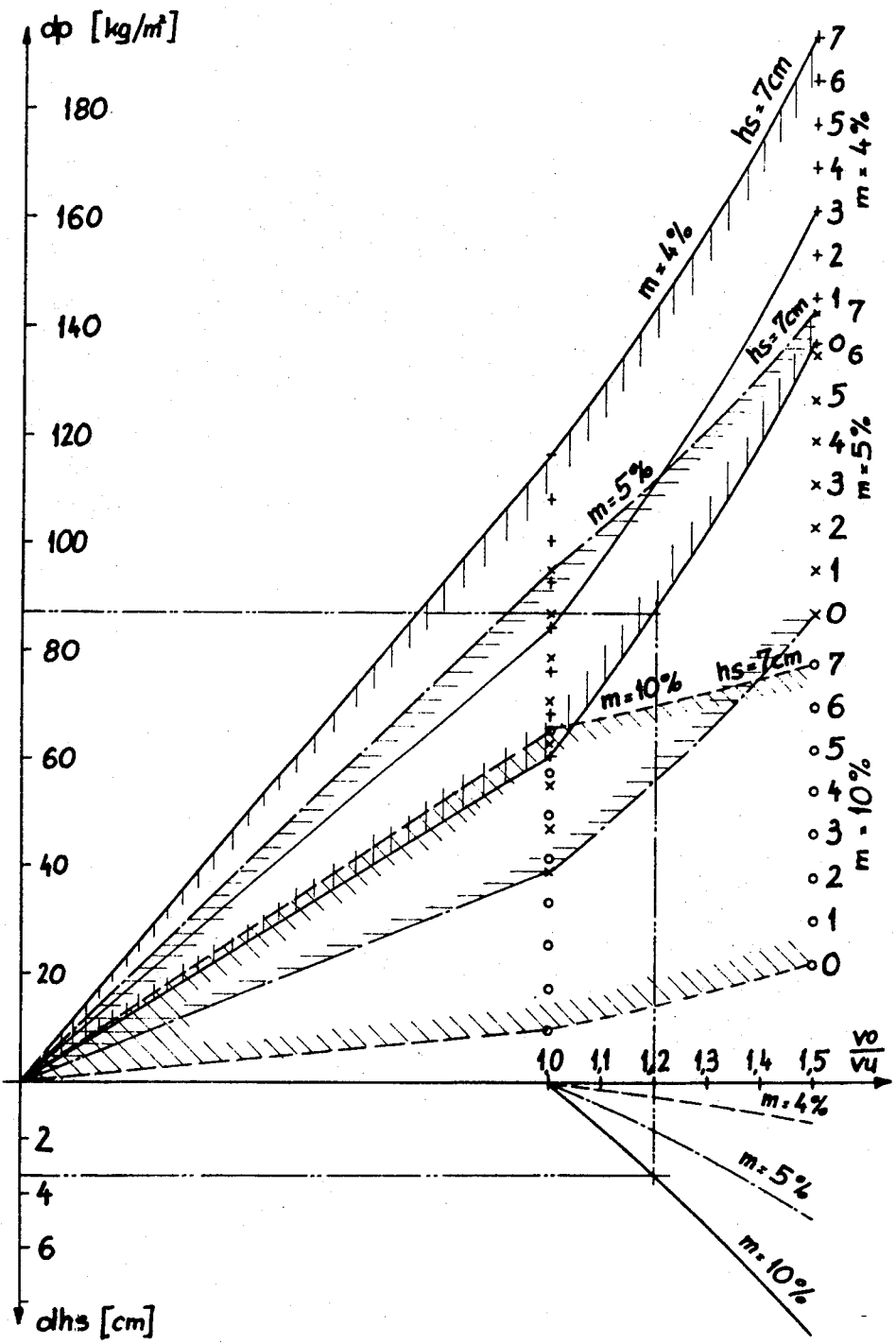
FIG. 2 is a graphic illustration of the course of the pressure gradient through a material support and different bulk material layers in dependence on the flow ratio, on the one hand, and the course of the limiting heights of bulk material layers with the same flow ratios but with different diaphragm effects, on the other hand.

FIG. 1 illustrates the principal relations between the treatment gas, flowing through a diaphragm in a pipe, and the forces acting on the bulk material above this diaphragm. The following symbols are used in the course of calculations based on FIG. 1 and resulting in the derivation of the total area of the material support:

$F$ = pipe area (in qm)
$f$ = diaphragm area (in qm)
$f/F = m$ = area ratio (indicated in % = $m \cdot 100$)
$a$ = diaphragm form factor
$hs$ = variation of layer (in m.)
$dhs$ = of height of layer (in m.)
$v'$ = velocity of the gas through the diaphragm (in m./s.)
$v$ = velocity of the gas through the pipe (in m./s.)
$vu$ = lower fluidization limiting velocity (in m./s.)
$vo$ = upper fluidization limiting velocity (in m./s.)
$dpa$ = pressure gradient above the material support (in kg./qm = mm. water column)
$dps$ = pressure gradient above the bulk material layer (in kg./qm = mm. water column)
$dp$ = total pressure gradient (in kg./qm = mm. water column)
$Gl$ = specific gravity of air (in kg./cu. m.)
$Gs$ = specific gravity of bulk material in kg./cu. m.)
$g$ = acceleration due to gravity (in m./s.$^2$)
$K$ = diffusing flow cone With respect to the specific gravity $Gs$, it should be pointed out that this specific gravity preferably is the specific volumetric bulk weight. Under this condition, the normal packing density of the bulk material is automatically taken into consideration.

The flow volumes through the diaphragm area $f$ and the pipe area $F$, respectively, are:

$$V = v \cdot F = v' \cdot f \qquad (1)$$

from this there follows:

$$v' = v \cdot F/a \cdot f = v/a \cdot m \qquad (2)$$

The total pressure gradient $dp$ is composed of the pressure gradient $dpa$ above the material support plus the pressure gradient $dps$ above the bulk material layer, and this may be expressed as follows:

$$dp = dpa + dps$$
$$dpa = v^2 \cdot Gl/(a^{20} m^2 \cdot 2g) \qquad (3)$$
$$dps = hs \cdot Gs \qquad (4)$$

From the relation $dp = dpa + dps$, and by using equations (3) and (4), there follows generally:

$$dp = (v^2 \cdot Gl)/(a^2 \cdot m^2 \cdot 2g) + hs \cdot Gs \qquad (5)$$

This general formula, for the total pressure gradient above the material support and the bulk material layer, applies also to different operating states of the fluidized bed. The lower fluidization limiting velocity $vu$ is considered as the case where the treatment gas can completely overcome, on the one hand, the flow resistance by the material support and, on the other hand, the flow resistance by the bulk material layer, in such a way that the desired dense, homogeneous fluidized bed layer of the bulk material with the minimum velocity of flow of the treatment gas represents a loose pouring.

The upper fluidization limiting velocity $vo$ is the velocity of the treatment gas at which the fluidized bed layer is just in advance of becoming dense-homogeneous, that is, it is the working point at which the fluidized bed layer passes over into the unstable, pulsating, pushing turbulence layer.

Under these conditions, the following equation results:

$$dp = (vu^2 \cdot Gl)/(a^2 \cdot m^2 \cdot 2g) + hs_2 \cdot Gs$$
$$= (vo^2 \cdot Gl)/(a^2 \cdot m^2 \cdot 2g) + hs_1 \cdot Gs \qquad (6)$$

In these two equations $hs_1$ and $hs_2$ denote the minimum and the maximum admissible bulk material layer on the material support at the respective lower and upper fluidization limiting velocity $vu$ and $vo$.

By suitable substitutions using equations (3) through (6), and with functions of bulk material weight, height of layer variations, ratio of upper to lower fluidization limiting velocities and minimum possible height of layer, there can be derived the following general pressure gradient equation:

$$dp = Gs \left( \frac{dhs}{1 - \left(\frac{vu^2}{vo}\right)} + hs_1 \right) \qquad (7)$$

In addition, the following value can be derived as the characteristic value for the diaphragm effect:

$$a \cdot m = \sqrt{\frac{1}{Gs \cdot dhs} \cdot \frac{(vo^2 - vu^2) \cdot Gl}{2g}} \qquad (8)$$

This relation is composed of defined quantities, selective quantities and those which are known, from tests, as empirical values. It must be kept in mind that the lower and upper fluidization limiting velocities $vu$ and $vo$, respectively, are already known. The second multiplicand under the root, containing the quantities $vo$, $vu$, $Gl$ and the double acceleration due to gravity $2g$ thus becomes a constant as follows:

$$c = \sqrt{(vo^2 - vu^2) \cdot Gl/2g} \qquad (9)$$

By using this constant, and by a slight reformation, there is obtained finally, for the diaphragm effect, the following equation:

$$c/a \cdot m = \sqrt{Gm \cdot dhs} \qquad (10)$$

This equation illustrates that the diaphragm effect is inversely proportional to the square root value of the specific surface load of the highest admissible bulk material layer acting on the material support, since the product $Gs \cdot dhs$ is equal to this specific surface load. As a proportionality factor, there appears the constant $c$ which has, within determined limits, at least one selective quantity $vo$. It should be mentioned that these derivations are made under the assumption of a laminar flow of the treatment gas, and by neglecting flow resistances on the pipe wall, and the justification for these assumptions can be readily proven.

The relations expressed in equations (7) and (10) are of principal importance, since they express clearly the operative behavior of the fluid bed by using a material support which meets these requirements and where the very narrow range of stable behavior, regarding the air velocity through the fluid bed, is not exceeded. Furthermore, equation (5) represents a principal relation where the two partial pressure gradients, above the material on the one hand, and in the material layer on the other hand, are nicely derived.

FIG. 2 illustrates graphically the different diaphragm effects resulting from a different perforation, or flow-through area, in the diaphragm plate underneath the porous mat. The pressure gradient, as a function of the treatment velocity with the diaphragm effect, on the one hand, and the height of layer, on the other hand, as a parameter, illustrate different characteristic working ranges and the respective height of layer variations between the lower and upper fluidization limiting velocities. A process state is delineated, in FIG. 2, by the dash-double dot line, with the ratio of the upper to the lower fluidization limiting velocity $vo/vu=1.2$. The diaphragm effect, due to the perforated plate upstream of the material support, occurs at an area ratio $m=4$ percent. The bulk weight of the material is 800 kg./cu. m. Under these conditions, there is obtained an admissible height of layer variation of slightly more than 3 cm. and a total pressure gradient, above the combination of the material support and the bulk material layer, of about 87 mm. of water column. As will be noted in FIG. 2, the corresponding height of layer variation $dhs$ results as a function of the fluidization limiting velocity ratios, where again the area ratio $m$ appears as a parameter. The area ratio must be equated with the diaphragm effect by also taking into account the diaphragm form factor $a$.

The ratio of the diaphragm effect $a \cdot m$ to height of layer variation $dhs$ also represents an essential criterion for the layout of the material support for performing the method. The corresponding development has been effected up to the relation expressed in the equation (10).

Figure 3:
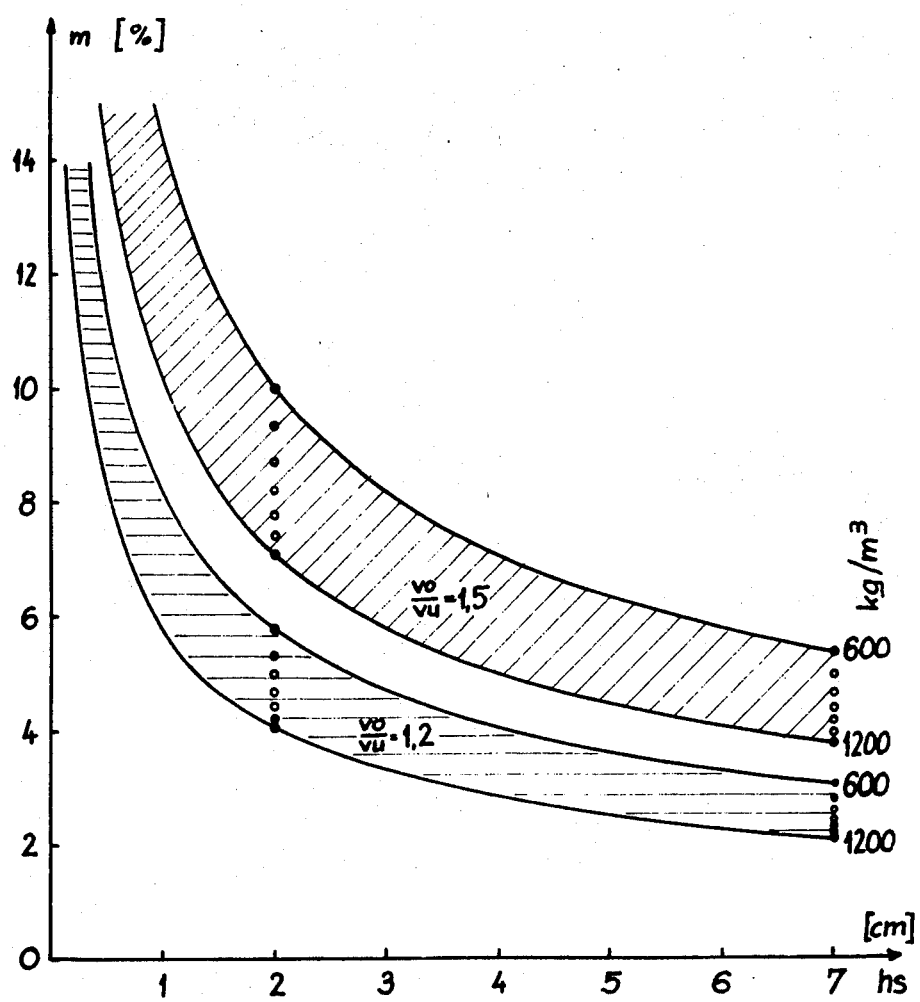
FIG. 3 is a graphic illustration of the necessary area ratios of the perforation or flow through area of a diaphragm with respect to the maximum heights of the layer of bulk material for various specific gravities of the bulk material and with different flow velocity conditions.

FIG. 3 graphically illustrates these relations where the characteristic hyperbolic course can be demonstrated using the parameters fluidization limiting velocity ratio $vo/vu$, on the one hand, and specific bulk weight of the material $Gs$, on the other hand. A safe velocity ratio $vo/vu=1.2$ and $vo/vu=1.5$, which is definitely at the top limit, has been assumed. With this ratio $vo/vu=1.2$, it can be seen clearly that an area ratio of 10 percent leads to extremely uninteresting admissible height of layer variations, since this variation is already much less than 1 cm., with a minimum bulk weight of the material of 600 kg./cu. m. This value drops even further for grain with a bulk weight of about 800 kg./cu. m. Although the ratios, for a velocity ratio of 1.5, look much better at first glance, it must be kept in mind that, due to the velocity of the treatment gas, which is at the upper limit, the very low height of layer variation $dhs$ leads very easily to unstable behavior of the heterogeneous turbulence layer. Slight variations of the layer thickness bring the operation of the fluid bed outside the stable limit.

In connection with the terms "diaphragm effect" and "ratio of diaphragm area to total area of the material support," it should be pointed out that only the diaphragm form factor, together with the area ratio, forms the diaphragm effect. The value of this form factor varies, in dependence on the layout of the holes in the perforated plate in the direction of flow. It lies between the limiting values 0.6 and 1.0. The effective cross section of a diaphragm therefore is, without special manufacturing measures, certainly smaller than that measured in the factory. In the case of punched holes, there results a diaphragm form factor in the ratio of 0.76, but this value still can vary considerably.

As mentioned above, limitations are necessary for the range between the upper and lower fluidization limiting velocities. The lower fluidization limiting velocity is determined by the requirement that all particles of the bulk material layer are carried at this velocity by the treatment gas current. The ratios for the upper value are more difficult to recognize and to determine. Experience has shown that the upper fluidization limiting velocity is between 1.2 and 1.5 times the lower fluidization limiting velocity, and is absolute in the range of 1.1 to 1.5 m./s., which values are used for deriving the curves in FIGS. 2 and 3.

Practical and economical considerations are also determinant for the design and manufacture of the porous, gas-permeable material support on the basis of the developed relations. It can be found, from the graphic representations, that very great height of layer variations $dhs$ are admissible with very small differences of the limiting velocity and very strong diaphragm effects $a \cdot m$, which can be achieved with very low area ratios $m$. However, the pressure gradient $dp$ above the material support and the bulk layer, to be overcome by the treatment gas, rises considerably. Such excessive pressure gradients lead, in many cases, to an uneconomical operation, since expensive flow generators must be used and must still work very uniformly and linearly while overcoming very great pressure differences, with high rates of flow of the treatment gas. For this reason, a compromise generally will be necessary in that the holes or apertures of the perforated plate cannot be selected too small, for manufacturing reasons. Experience indicates that the limit is approximately at 2 percent for the value $m$.

However, the lower limit is not set only for manufacturing reasons, but forms another qualifying condition from the standpoint of a trouble-free operation of the treatment apparatus. In general, it is advisable to design the apparatus so that the treatment gas current need not be purified already at the inlet of the apparatus. It should be possible to use the treatment gas current in its natural form and without preliminary treatment. For this reason, the apertures in the perforated plate, for the production of the diaphragm effect, and the gas-permeable porosity of the mat, on the one hand, and as a supporting surface for the above material, on the other hand, must not be selected to be too small, since this would lead, within a very short time, to contamination and clogging, thus impairing the fluid bed treatment. A 2 percent area ratio therefore must be generally considered as a lower limit from this viewpoint also. Considerations of economical operation are also necessary with respect to the pressure gradient. On the one hand, a very great height of layer variation may be required, so that it would be necessary to work with very high pressure differences. However, these height of layer variations can be reduced, in many cases, to much lower values, if the total surface over which the bulk material to be treated is distributed, and over which this material flows, is divided into a more or less large number of partial surfaces. There can thus be obtained, above the individual partial surfaces, much smaller height of layer variations, a better air distribution over the total surface, and reasonable limitations of height of layer variations, so that the treatment method is much simpler to carry out. For these reasons, a pressure gradient of 150 mm. of water column proves to be the upper limiting value. Beyond this, experience indicates that very good operating conditions can also be attained with pressure gradients between 20 and 100 mm. of water column, even from the viewpoint of economical operation.

As an example, it can be mentioned that it has been found, in an extensive series of tests for the treatment of grain, particularly wheat, that very good operating results were obtained in an apparatus with material supports having area ratios between 4 and 6 percent in the perforated plate and a screen with a mesh aperture of about 1 mm. as a gas-permeable mat, in a pressure range below 100 mm. of water column with admissible height of layer variations of up to 6 cm. Great heights of layer, however, are tantamount to a high throughput capacity.

As mentioned above, the size of the apertures in the perforated plate and, partly related to it, the area ratio, have a great influence on the reliability of this treatment method, since the danger of dusting and clogging can be reduced considerably. The required diaphragm effect, and thus the higher pressure gradient above the material support, can also be achieved if there is used, instead of the combination of screens and perforated plate, a very fine porous material, such as sintered metal plates. These sintered metal plates have the great disadvantage, however, that an extremely pure treatment gas must be available for the inflow, and that bulk materials which are dust-laden cannot be treated. If one or both requirements are not met, the gas-permeable pores of the sintered metal will be clogged, so that the operation must be terminated within a short time.

Various embodiments of apparatus can be designed for performing the method. A characteristic of all designs is, however, that the material support must meet the determined requirements and that it can be produced in a suitable manner. To meet these requirements, the material support can be designed, with advantage, as illustrated in FIGS. 4 and 5. The porous gas-permeable mat, particularly in the form of a screen 102, is placed over the frame 100. Beneath the frame 100 and at a distance from the porous gas-permeable mat 102, there is secured a perforated plate 105 having apertures 106 whose whole area represents the perforation or flow through area. The distribution of diaphragm apertures 106 over the total surface of perforated plate 105 is such that the flow cone K, diffusing or enlarging between perforated plate 105 and porous mat 102, assures, on porous mat 102, a uniform distribution of the flowing treatment gas over the entire area of porous mat 102.

In certain cases, it is advantageous if the total surface of the porous gas-permeable material support is divided into partial surfaces. To this end, partitions 108, 109 can be positioned between mat 102 and perforated plate 105 and extend, for example, parallel to the sidewalls of the material support and which have a height exactly equal to the spacing between mat 102 and plate 105. It has further been found to be advantageous to assemble the entire construction by cementing, since this permits the use of very thin partitions, which is necessary for a very uniform distribution of the treatment gas in the bulk material flowing over the mat 102. No additional measures are thus necessary to assure this distribution above the mat. The installation of material supports embodying the invention in material treatment plants is effected in a known manner.

By using the indicated method steps, and by performing the method in the described apparatus, there is attained, in a surprisingly simple manner, a firm control of the formation of a dense, homogeneous, stable fluid bed for the treatment of bulk materials in the demonstrably very narrow admissible range of fluidization air velocity. The described measures also permit the formation of a material support which is insensitive to clogging of practically any type, so that, on the one hand, the quality of the treatment does not have to meet very high requirements as far as purity is concerned, and on the other hand, the bulk material to be treated does not have to have any special quality features. Such a material support therefore can be used for the treatment of very difficult bulk materials, particularly those which are dust-laden and thus could easily clog fine-meshed and fine-pored material supports.

Since a very favorable air distribution over the entire area of the porous mat is attained already by the uniform distribution of the relatively small apertures in the perforated plate, and forming the perforation or flow through area, an equalization of the flow of the treatment medium through the various layers in individual zones or panels can be attained in case of major differences of heights of layers over the total surface of the material support.

While a specific embodiment of the invention has been shown and described in detail to illustrate the application of the principles of the invention, it will be understood that the invention may be embodied otherwise without departing from such principles.

What is claimed is:

1. A method for assuring a steady flow of treatment gas through a mixture of bulk materials which flows, in a dense, homogeneous fluidized bed layer of varying height, over a porous, gas-permeable material support comprising a screenlike porous gas-permeable mat carrying the bulk material and a perforated plate spaced a distance beneath the mat for flow of the treatment gas therethrough in advance of flow through the mat, said method comprising the steps of controlling the velocity of the treatment gas within a range assuring the maintenance of a dense, homogeneous fluidized bed layer; selecting the diaphragm effect of the flow-through area of the perforated plate, within the velocity range, at a value inversely proportional to the square root value of the specific surface load of the maximum admissible bulk material layer acting on the material support; and subjecting the treatment gas, in addition to the effect exerted by the porous mat and the fluidized layer, to a velocity variation caused by the diaphragm effect of the flow-through area of the perforated plate.

2. A method, as claimed in claim 1, including the step of maintaining a pressure gradient on the flowing treatment gas of not in excess of 150 mm. of water column by varying the velocity of the treatment gas flowing through the flow-through area of the perforated plate and the screenlike mat and the dense, homogeneous fluidized bed layer.

3. A method, as claimed in claim 2, including the step of maintaining such pressure gradient at a value at least equal to 20 mm. of water column.

4. A method, as claimed in claim 2, including the step of maintaining such pressure gradient at a value of not more than 100 mm. of water column.

5. In apparatus for ensuring a steady flow of treatment gas through a mixture of bulk materials which flows, in a dense, homogeneous fluid bed layer of varying height, over a porous, gas-permeable material support, and in which the support comprises a screenlike porous gas-permeable mat carrying the bulk materials and a perforated plate spaced a distance beneath the mat for flow of the treatment gas therethrough in advance of flow through the mat, the improvement comprising, in combination, said plate having a total area of its perforations, traversed by the treatment gas, not greater than one-tenth of the total area of said material support.

6. A material support, as claimed in claim 5, in which the area of the gas-permeable porosity of said screenlike mat is at least twice the flow-through area of said perforated plate.

7. A material support, as claimed in claim 5, in which the perforations of said perforated plate are circular apertures uniformly distributed over the surface of said material support.

8. A material support, as claimed in claim 7, in which the ratio between the apertures in said perforated plate and the spacing between said perforated plate and said mat is such that the treatment gas flowing through said apertures and then flowing as an expanding cone from the said apertures to said mat is distributed uniformly over the entire surface of said mat.

9. A material support, as claimed in claim 5, in which the total flow-through area of said perforated plate is between 3 and 5 percent of the total area of said material support.

10. A method for manufacturing a material support for the treatment of bulk materials by a steady flow of treatment gas therethrough in a dense, homogeneous fluidized bed, said material support comprising a screenlike porous gas-permeable mat carrying said bulk materials and a perforated plate spaced a distance beneath the mat for flow of the treatment gas therethrough in advance of said mat, said method comprising the steps of selecting an additional diaphragm effect of the flow-through area of the perforated plate on the flow of treatment gas, to the effect thereon exerted by the mat and the fluidized materials layer, within the velocity range of the flow of treatment gas between a lower and a higher limit, at a value inversely proportional to the square root value of the specific surface load of the maximum admissible bulk materials layer acting on the material support.

11. A method for the treatment of bulk material on a material support by a steady flow of treatment gas through a layer of said bulk material to be moved over said material support in a dense, homogeneous fluidized bed, said material support comprising a screenlike porous gas-permeable mat carrying said bulk materials and a perforated plate spaced beneath the mat for flow of the treatment gas therethrough in advance of said mat, said method comprising the steps of selecting an additional diaphragm effect of the flow-through area of the perforated plate on the flow of treatment gas to the effect thereon exerted by the mat and the fluidized materials layer, within the velocity range of the flow of treatment gas between a lower and a higher limit speed, at a value inversely proportional to the square root value of the specific surface load of the maximum admissible bulk materials layer acting on the material support.

12. An apparatus for the treatment of a mixture of bulk materials over a porous, gas-permeable material support by a steady flow of treatment gas through said support and said bulk material to be moved thereover in a dense, homogeneous fluid bed layer of varying height, over a porous, gas-permeable material support, and in which the support comprises a screenlike porous gas-permeable mat carrying the bulk materials and a perforated plate spaced beneath the mat for flow of the treatment gas therethrough in advance of the mat, the improvement comprising, in combination, said plate having a total area of its perforations, traversed by the treatment gas, not greater than one-tenth of the total area of said material support.

* * * * *